E. C. WIDEMAN.
SOAP POWDER SPRAYER.
APPLICATION FILED APR. 12, 1912.
1,038,251.
Patented Sept. 10, 1912.
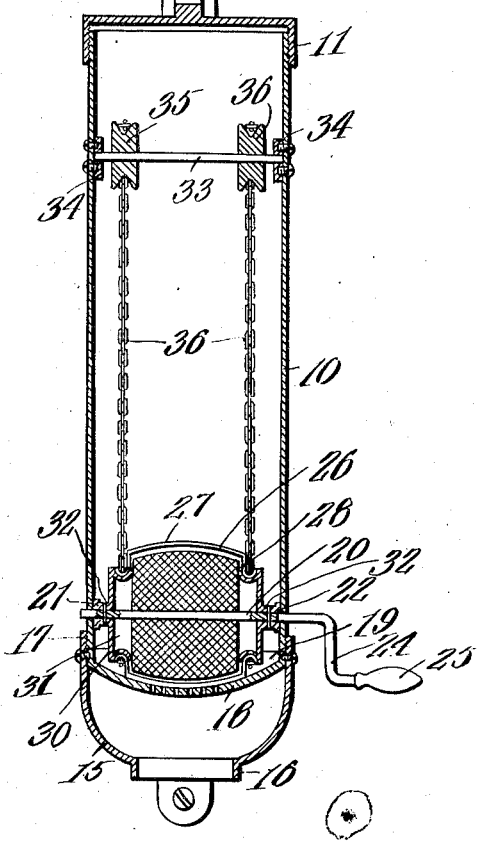
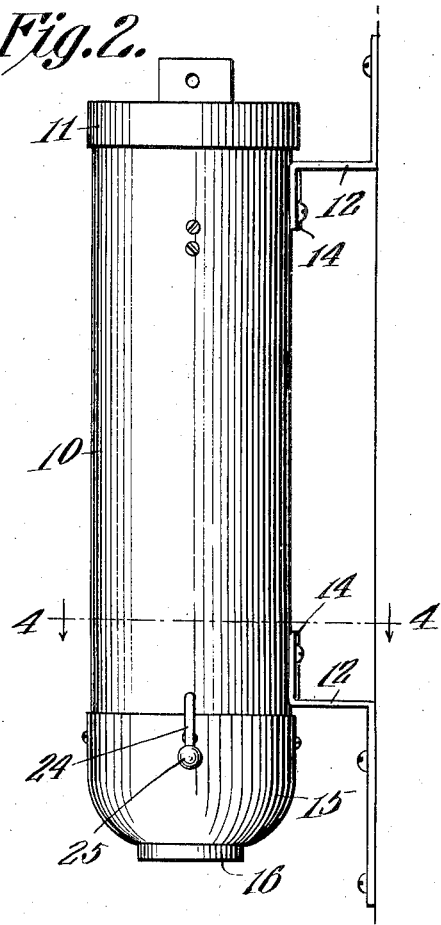
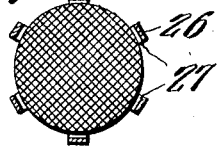
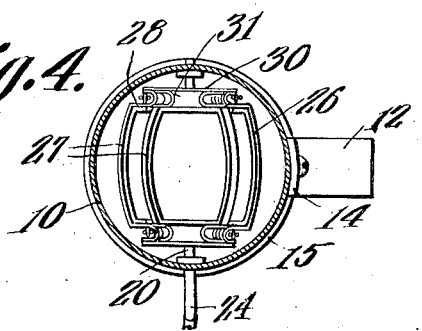
Edmund C. Wideman,
Inventor
Witnesses
by C. A. Snow & Co.
Attorneys

UNITED STATES PATENT OFFICE.

EDMUND C. WIDEMAN, OF WILKES-BARRE, PENNSYLVANIA.

SOAP-POWDER SPRAYER.

1,038,251.  Specification of Letters Patent.  Patented Sept. 10, 1912.

Application filed April 12, 1912. Serial No. 690,418.

*To all whom it may concern:*

Be it known that I, EDMUND C. WIDEMAN, a citizen of the United States, residing at Wilkes-Barre, in the county of Luzerne and State of Pennsylvania, have invented a new and useful Soap-Powder Sprayer, of which the following is a specification.

This invention relates to an improvement in soap powder sprayers.

The primary object of the invention is to provide a dispensing apparatus for powdered soap which may conveniently distribute the powder, agitating means being provided which extends longitudinally through the column of powder, said agitating means being actuated by the distributing mechanism.

With the foregoing and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings,—Figure 1 is a vertical section. Fig. 2 is a side elevation. Fig. 3 a section taken transversely through the rotary agitator, and Fig. 4 a section taken on the line 4—4 of Fig. 2.

In the drawings, 10 designates a cylindrical casing which is provided with the cap 11 and which is preferably supported by brackets 12 the offset ends 14 of which are secured to the casing, the other ends of said brackets being secured to the wall or other support. The lower end of the casing 10 is closed by the cap 15 which terminates in the reduced delivery spout 16. The cap 15 is screw threaded and receives the screw threaded terminals 17 of the casing 10. A perforated concave plate 18 is supported by the cap, the flange 19 of said concave plate being secured to the cap, said flange abutting the terminals 17 of the casing when the cap embraces the entire screw threaded portion of said terminal. A shaft 20 is disposed transversely of the casing adjacent its lower end, said shaft being supported by bearings 21 and 22, the shaft terminating in the crank 24 to which is secured the operating handle 25. Arranged on said shaft is a rotary distributer 26 which consists of a plurality of arms 27, the terminals 28 of which are offset and secured to the plates 30 which constitute the end walls of the distributer. These plates are provided with the channeled extensions 31, the bosses 32 of said plates being secured to the shaft 20, the channeled extensions serving as pulleys. A shaft 33 is arranged adjacent the upper end of the casing, through which the powder is supplied, said shaft 33 being supported by bearings 34 disposed within the casing. A plurality of pulleys 35 and 36 are arranged on said shaft, said pulleys being disposed in alinement with the channeled flanges or extensions 31 of the plate 30. Chains 36' pass over said pulleys and over said channeled extensions.

It will be seen that as the distributer 26 is rotated, movement will be imparted to the chain, the movement of which will agitate the column of powder preventing the same from arching over the distributer and assuring the proper feeding of the same, it being noted that a free delivery of the powder is in this manner assured.

The rotary agitator, as before stated, consists of the end walls 30, which are connected by the arms 31. These arms embrace the cylinder 37 which is formed of pulp or other absorbent material, the cylinder serving the double function of absorbing moisture which penetrates through and preventing the powder from passing through plate 18 until the agitator is operated. This plate as before stated, is provided with a plurality of apertures, the powder when agitated passing through said apertures. Attention is called to the fact that the plate 18 may be adjusted with respect to the rotary distributer to regulate the degree of trituration. Attention is called to the fact that various forms of spouts may be used in supplying different materials.

What is claimed is:—

1. A powder spraying device consisting of a cylinder, a rotary distributer arranged within said cylinder, a shaft arranged transversely of the cylinder and spaced from said distributer, sheaves arranged on said shaft, and chains passing over said sheaves and actuated by said distributer for agitating the powder.

2. A powder spraying device, consisting of a cylinder, an adjustable concaved plate secured to one end of said cylinder, said plate being formed with perforations, a rotary distributer disposed adjacent said plate, and agitating means disposed for movement longitudinally of the cylinder and actuated by said rotary distributer.

3. A powder spraying device, consisting of a receptacle, a dispensing spout, an agitating mechanism, and a member formed of absorbent material disposed adjacent said spout.

4. A powder spraying device, consisting of a cylinder, a rotary distributer arranged within said cylinder, said distributer having its terminals provided with annular grooved members, a shaft disposed transversely of the cylinder, sheaves mounted on said shaft, and an agitating chain passing over said sheaves and said grooved members.

5. A powder spraying device, consisting of a receptacle, a dispensing spout, an agitating mechanism, said agitating mechanism including a cylinder formed of wire mesh and a member formed of absorbent material disposed within said distributer.

In testimony that I claim the foregoing as my own, I have hereto affixed my signature in the presence of two witnesses.

EDMUND C. WIDEMAN.

Witnesses:
 JOHN H. WILCOX, Jr.,
 CLARK S. TOTTEN.